United States Patent [19]

Arakawa et al.

[11] Patent Number: 4,692,008
[45] Date of Patent: Sep. 8, 1987

[54] DISPLAY DEVICE FOR CAMERA

[75] Inventors: Kazuhiko Arakawa, Tokyo; Go Tokura, Kanagawa; Kazuo Fujibayashi, Kanagawa; Masayoshi Kiuchi, Kanagawa; Yoshihito Harada, Kanagawa, all of Japan

[73] Assignee: Canon Kabushiki Kaisha, Japan

[21] Appl. No.: 823,621

[22] Filed: Jan. 29, 1986

[30] Foreign Application Priority Data

Feb. 1, 1985 [JP] Japan .................................. 60-16623

[51] Int. Cl.⁴ .......................... G03B 1/66; G03B 17/18; G03B 17/36
[52] U.S. Cl. ............................... 354/217; 354/289.12; 354/474
[58] Field of Search ................ 354/217, 289.1, 289.11, 354/289.12, 472, 474, 215

[56] References Cited

U.S. PATENT DOCUMENTS 4,313,657 2/1982 Tokutomi et al. .................. 354/474
4,432,628 2/1984 Sakurada et al. ............... 354/289.12
4,589,755 5/1986 Maitani et al. ............... 354/474 X Primary Examiner—Michael L. Gellner
Attorney, Agent, or Firm—Toren, McGeady & Associates

[57] ABSTRACT

A display device for a camera in which a first display, showing a film feeding state, is presented by time-serially driving a plurality of patterns arranged in a row, and a second display, showing photographic information, is presented by selectively driving a particular one of the patterns. Circuitry is provided for inhibiting the second display during a period in which film feeding is in progress, thereby enabling the use of the same patterns for the two displays.

6 Claims, 13 Drawing Figures

FIG.5
| INPUT SIGNAL | | OUTPUT SIGNAL (D) |
|---|---|---|
| X | Y | |
| 0 | 0 | b1 ~ b13 |
| 0 | 1 | b1 ~ b13 |
| 1 | 0 | c1 ~ c13 |
| 1 | 1 | a1 ~ a13 |
FIG.6A
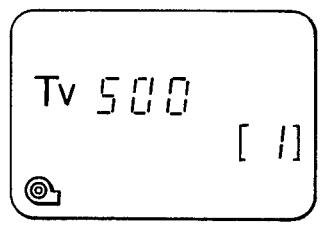
FIG.6B
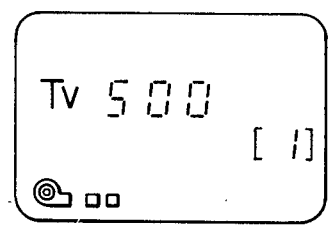
FIG.6C
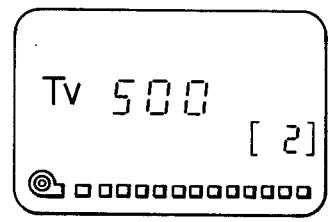

FIG.7
| COUNTED VALUE | DIGIT DISPLAY 13 |
|---|---|
| 0 | BLANK |
| 1 | BLANK |
| 2 | BLANK |
| 3 | BLANK |
| 4 | 1 |
| 5 | 2 |
| ⋮ | ⋮ |
| 39 | 36 |
FIG.8A
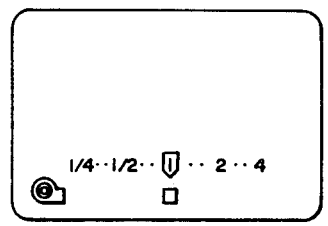
FIG.8B
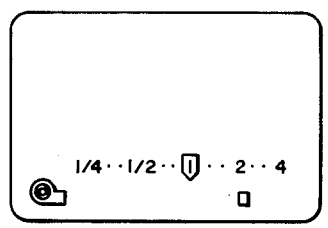
FIG.8C
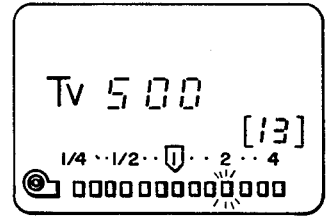
FIG.8D
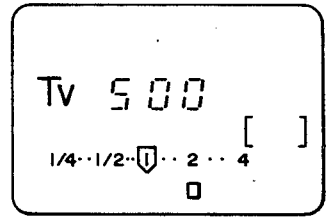

DISPLAY DEVICE FOR CAMERA

BACKGROUND OF THE INVENTION

1. Field of an Invention

This invention relates to improvements of the external display device for a camera for displaying photographing information such as film feeding state.

2. Description of the Prior Art

In the past, various information necessary to photography have been set by switches or dials, and the values that are set have been displayed by indications on all of the various switches and dials. Hence, the user has been unable to see at a glance what exposure the camera will make. Therefore, the possibility of getting unacceptable photographs has been high. To avoid this, a camera has been proposed in which almost all of the displays of photographic information are concentrated into an area of large size on the upper panel of the camera housing.

Recently, there has been another proposal for introducing a capability of setting a desired value of exposure correction factor in the camera. But, as a dial is used for such setting purpose, its set value is displayed by the dial itself. Since it is desirable to display this information of exposure correction factor continuously during the exposure, this information, too, should be added to that displayed in the large size area.

However, due to the fact that so much photographing information occupies the concentrated area, and that the upper panel of the camera housing also needs to bear other operating members, the size of the display area cannot be largely increased, and as such limitations are laid on the numbers of display patterns or segments. It has been very difficult to add more information into that display area. If it is done, a problem will arise that the display as a whole becomes hard to read.

SUMMARY OF THE INVENTION

An object of the present invention is to provide an external display device for a camera which has overcome the above-described problems, and enables exposure correction information to be displayed in such a form as to allow the user to read it easily and quickly, without involving an increase in the size of the display area.

Another object is to utilize a display member of a plurality of dot marks representing the film transporting state or the like in such a way that the form of display is made different between when the film is being transported, and when the exposure correction information is being stored, givin an advantage that as the display elements are commonly used, space efficiency is improved.

To achieve these objects, according to the invention, each mark of the display row is provided with an index representing one of the graduation of an exposure correction scale, and control means is provided for, when an exposure correction is made, changing the display of that mark which represents the present value of exposure correction factor, and maintaining always at a different form from that of the display of film transportation. Thus, the linear display, consisting of a plurality of marks for displaying film transportation, is made to also serve as a display portion for the preset value of exposure correction factor.

These and other objects of the invention will become apparent from the following description of an embodiment thereof, taken in conjunction with the accompanying drawings.

BRIEF DESCRIPTION OF THE DRAWINGS

FIG. 5 is a table illustrating the relationship between the input and output signals of the data selector of FIG. 4.

FIGS. 6A to 6C are plan views of the display in successive three operative positions informing that the film is advancing.

FIG. 7 is a table illustrating the relationship between the content of the frame counter of FIG. 3 and the actually displayed number of frames.

FIGS. 8A to 8D are plan views of the device of the invention in different operative positions illustrating the changing form of display of the exposure correction factor.

DETAILED DESCRIPTION OF THE PREFERRED EMBODIMENT

The present invention will next be described in detail in connection with an embodiment thereof.

Figure 1:
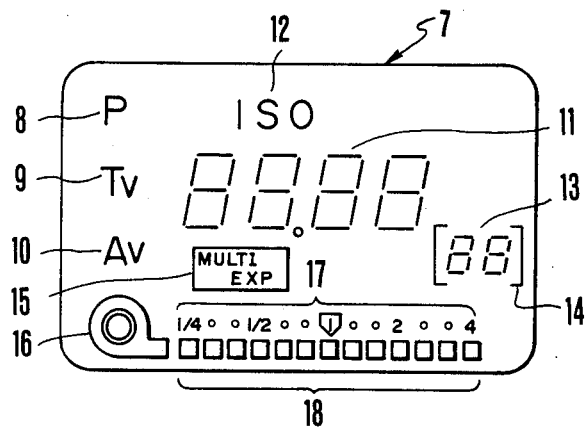
FIG. 1 is a plan view of an embodiment of a liquid crystal display according to the present invention with all patterns lighted.
Figure 2:
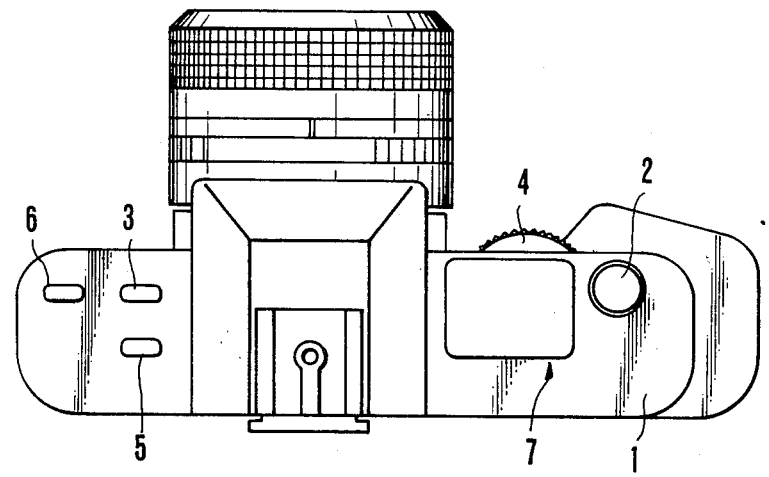
FIG. 2 is a top view of a camera having an external display device to which the invention is applied.
Figure 3:
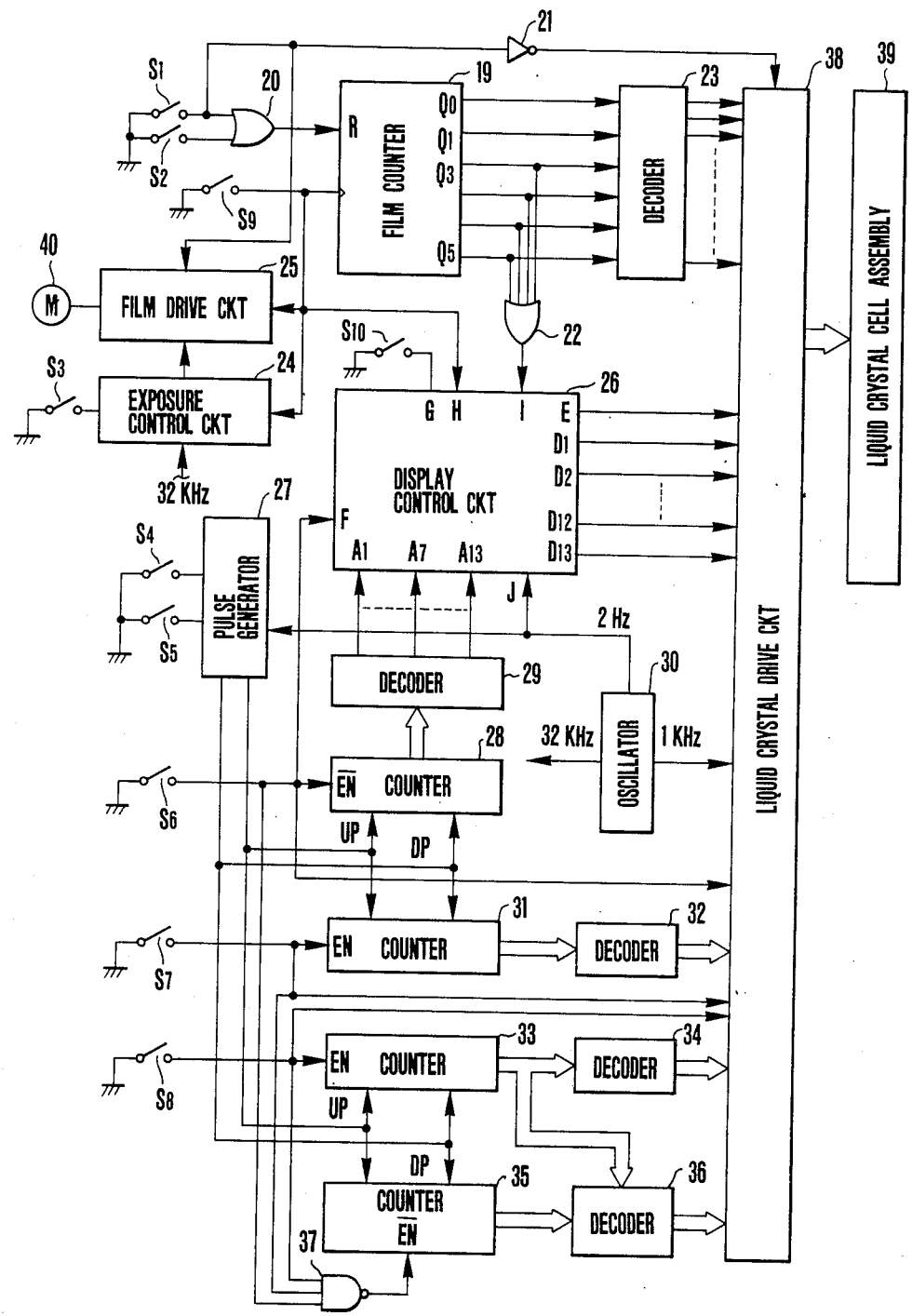
FIG. 3 is a block diagram of the circuitry of the device of the invention.

In FIGS. 1 to 3 there is shown one embodiment of the invention in which the camera has a housing whose upper panel 1 bears a shutter release button 2, an exposure mode selector button 3 cooperative with a dial 4 in such a manner that while the button 3 is being pushed down, the dial 4 is turned to select one of various exposure modes (shutter speed priority mode, aperture priority mode, and programmed modes), a film sensitivity setting button 5 also cooperative with the dial 4 in such a manner that while the button 5 is being pushed down, the dial 4 is turned to select one of various values of film sensitivity (ISO 100, ISO 200, . . . ), an exposure correction value setting button 6 cooperative with the dial 4 in such a manner that while the button 6 is being pushed down, the dial 4 is turned to select one of various values of exposure correction factor (in this embodiment, from ¼ to 4 times), and a liquid crystal display 7 in which photographing information, including those set in by the aforesaid buttons, are shown.

The display 7 of FIG. 2 has patterns 8 to 10, upon selection of the programmed mode, shutter speed priority mode, or aperture priority mode, respectively, to appear dark on a white background, a digital display portion 11, comprising four sets of 7-segments for digits and one segment, for a dot by which the preset value of film sensitivity, shutter speed, or aperture is displayed, another pattern 12 which appears when the digital display portion 11 presents the film sensitivity, another digit display portion 13, comprising two sets of 7-segments, for the number of exposed film frames or a desired number of exposures to be superimposed one after another, another pattern 16 which appears upon loading of a film cartridge, a linear index array 17 of single segments which appears upon setting of a value of the exposure correction factor or making exposure correction, and a bar display portion 18, comprising a large number of dot marks, arranged either to be lighted in a serial fashion from left to right, or to be selectively lighted one at a time (except for that dot which is in registry with the index representing the unity of exposure correction factor).

A practical example of the circuitry of the device of the invention, shown in FIG. 3, include a switch S1 arranged to turn on when the camera is loaded with a film cartridge, another switch S2 arranged to turn off upon opening of a back cover of the camera housing and to turn on upon closure thereof, a release switch S3 arranged to turn on upon depression thereof, and shift up and shift-down switches S4 and S5, respectively, arranged to turn on and off, repeatedly, upon rotation of the dial 4 in clockwise or counterclockwise direction. For example, when the dial 4 turns in the clockwise direction by one click, the shift-up switch S4 turns on once. Conversely, when the dial 4 turns one click in the counterclockwise direction, the shift-down switch S5 turns on once. When the exposure correction factor setting button 6 is pushed down, a switch S6 turns on. When the film sensitivity setting button 5 is pushed down, a switch S7 is turned on. When the exposure mode selector button 3 is pushed down, a switch S8 is turned on. When the film has advance one frame, a switch S9 turns off; but switch S9 is maintained on during times when the film is advancing. Another switch S10 turns on and off, repeatedly, as the film is advancing.

A counter 19, further included for counting the number of film frames passing across the film gate, is set when the switches S1 and S2 both are ON, counts up one increment each time the switch S9 turns on. Also shown in FIG. 3 are an OR gate 20; an inverter 21; another OR gate 22, which changes its output to high level when an automatic loading operation terminates, the content of the counter 19 becoming "4", and maintains its output at the high level thereafter; a decoder 23 for decoding the content of the frame counter 19; an exposure control circuit 24, which releases the shutter (not shown) when the release switch S3 turns on under the condition that the switch S9 is OFF; a film drive circuit 25, responsive to an output signal from the circuit 24 for initiating a film winding operation; a display control circuit 26, for the index pattern 17 and the bar display portion 18, of which the details are shown in FIG. 4; a pulse forming circuit 27 responsive to cycles of ON-and-OFF operation of the shift-up or shift-down switches S4 or S5 for producing a train of UP or DOWN pulses; another counter 28 for setting exposure correction values; a decoder 29 for decoding the content of the counter 28; an oscillator 30 for producing a 32 KHz signal which is applied to the exposure control circuit 24, 2 Hz which is applied to the pulse forming circuit 27, and a 1 KHz signal which is applied to a liquid crystal driving circuit 38; a counter 31 for setting film sensitivity; a decoder 32 for decoding the contents of the counter 31; a counter 33 for setting the exposure mode; a decoder 34 for decoding the contents of the counter 33; a counter 35 for counting the aperture value, shutter time and predetermined value based on the program line of the programmed mode; a decoder 36 receptive of the information from the counters 33 and 35 for decoding the aperture value, shutter time and the predetermined value of the programmed mode; a NAND gate 37; a liquid crystal drive circuit 38, a liquid crystal element assembly 39, constituting all the patterns and display portions shown in FIG. 1 and arranged to be driven by said drive circuit 38; and an electric motor 40 for performing a film winding operation.

Figure 4:
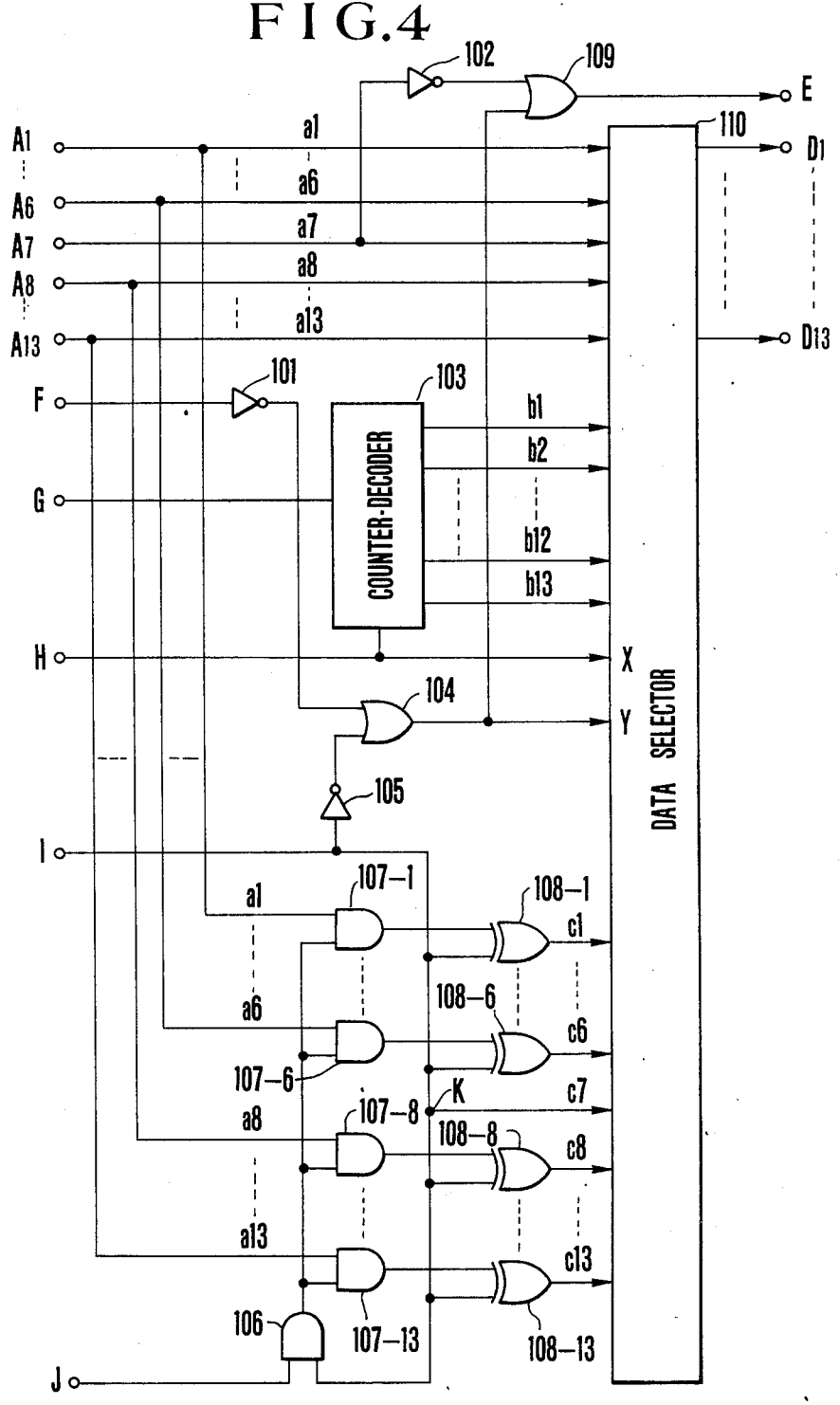
FIG. 4 is an electrical circuit diagram illustrating the details of the control circuit of FIG. 3.

FIG. 4 illustrates the details of the display control circuit 26 of FIG. 3, and includes inverters 101 and 102 having inputs connected to input terminals F and A7, respectively; a counter-decoder 103 for counting the pulses from the switch S10 through an input terminal G as it turns on and off repeatedly, and producing output signals b1 to b13 by which the film advancing state is displayed through the bar display portion 18; a 2-input OR gate 104; an inverter 105 having an input connected to an input terminal I; an AND gate 106 receptive of a pulsating signal of 2 Hz from another input terminal J at the time of the termination of the film winding operation for producing it at its output; AND gates 107 (107-1 to 107-6 and 107-8 to 107-13) responsive to setting of one of the values (except "1") of the exposure correction factor for causing the one of the dot marks (in the bar display portion 18) which, is assigned to that set value, to blink, exclusive OR gates 108 (108-1 to 108-6 and 108-8 to 108-13) for producing output signals c (c1 to c6 and c8 to c13); another OR gates 109 for causing the index pattern 17 to appear when a value (except "1") of the exposure correction factor is set, under the condition that the output of the OR gate 22 is low level (the content of the frame counter 19 is not "4" or more); and a data selector 110 receptive of a set of signals a1 to a13 from input terminals A1 to A13, a set of signals b1 to b13 from the counter-decoder 103, and the set of signals c1 to c6 and c8 to c13 from the exclusive OR gates 108 and a signal c7 from a junction point K for producing one of these sets (a, b or c) at output terminals D1 to D13 depending upon the combination of the states applied to input terminals X and Y thereof. The terminals D1 to D13 are connected to respective display elements in the portion 18 of FIG. 1.

The operation of the device of FIGS. 1 to 4 is explained below with reference to FIGS. 6A to 6D. After a film cartridge is loaded and the back cover is closed (the switches S1 and S2 are closed), when a releasing operation terminates, the exposure control circuit 24 produces a film winding start signal. Responsive to this, the film drive circuit 25 energizes the motor 40, initiating a film winding operation. The switch S9 then turns on, producing a signal of low level which is applied to the input terminal H of the control circuit 6, thereby, the counter-decoder 103 is rendered operative and is released from its reset state. Also, responsive to that signal applied to the input terminal X, the data selector 110 applies the data signals b1–b13 from the counter-decoder 103 to the output terminals D1–D13 and therefrom to the liquid crystal drive circuit 38. Because, at first (at the start of an automatic blank frame feeding operation), the content of the counter-decoder 103 is [0], the liquid crystal display 7 has the bar portion 18 with all its elements turned off as shown, for example, in FIG. 6A, though the preset exposure mode (in FIG. 6, shutter priority mode) and the preset value of shutter time (1/500 sec.) are displayed, while the area between the brackets 14 is blank, as shown in FIG. 8D. Then, as the film is being fed, the switch S10 is turned on and off, repeatedly, applying pulses to the counter-decoder 103 through the input terminal G. As its content changes to [1], [2], [3], . . . , the dot marks in the bar display portion 18 light up successively from left to right (see FIG. 6B). Looking at this, the user is informed of the fact that automatic loading is in progress.

Each time one frame passes through the film gate, as the switch S9 turns off, the frame counter 19 counts up one pulse. When the fourth frame comes into the film gate, the automatic loading stops and a digit of [1] appears within the brackets 14. This also causes the output of the OR gate 22 to change to a high level, allowing the display control circuit 26 to present a display of the exposure correction factor.

Now assuming that no exposure correction is made (the exposure correction factor takes unity), then the content of the counter 28 becomes [7]. Responsive to this, the decoder 29 produces a high level signal for the input terminal A7 of the control circuit 26 and a low level signal for the other input terminals A1 to A6 and A8 to A13. This latter low level signal level then causes all the AND gates 107 to produce outputs of low level which are applied to the respective exclusive OR gates 108 one of their inputs. Since, at this time, the other inputs of the exclusive OR gates 108 are supplied with the signal of high level from the OR gate 22 through the input terminal I, the signals c1 to c6 and c8 to c13, received by the data selector 110, are at a high level. The signal c7, too, is at a high level, because the signal at the input terminal I is applied to the junction point K as it is. As a result, all the signals c1 to c13 become high level. At this time, it also results that since the film winding operation is completed (the switch S9 is turned off), the signal at the input terminal X of the data selector 110 takes a high level, and, for, as the exposure correction switch S6 is OFF and the output of the OR gate 22 is high level, the OR gate 104 produces a signal of low level, the signal at the input terminal Y has low level, and, therefore, that the data selector 110 selects the signals c1 to c13 to be transferred to the output terminals D1 to D13. Therefore, all the dot marks in the bar display portion 18 are lighted as shown in FIG. 6C, informing the user of the fact that the film has advanced through the full length of one frame. It is in this case that, as will be understood from the foregoing, because the signal a7 is high level, the output of the inverter 102 becomes low level, and so the output of the OR gate 109, and the output of the terminal E, become low level, causing the exposure correction scale pattern 17 not to appear in the liquid crystal display 7.

Alternatively, assuming that the exposure correction switch S6 is turned on in the film wound-up position, then, as a signal of low level is applied to the enable terminal $\overline{EN}$ of the counter 28, this counter 28 is rendered operative. Since that signal is also applied to the input terminal F of the display control circuit 26, the output of the inverter 101 changes to high level, and the outputs of the OR gates 104 and 109 also become high level. Responsive to the signal of high level from the OR gate 104 to the input terminal Y (at this time, the signal at the input terminal X is high level), the data selector 110 selects the signals a1 to a13 to be applied to the output terminals D1 to D13. Meanwhile, such change of the output of the OR gate 109 to high level causes the liquid crystal drive circuit 38 to present a display of the scale pattern 17, while all the other patterns, except the cartridge-shaped pattern 16, disappear, informing that the exposure correction setting mode is operating. For example, as no exposure correction is made yet, the content of the counter 28 is [7]. In the display 7, therefore, as shown in FIG. 8A, only one dot mark at the seventh place, counting from the left, is on, representing unity of the exposure correction factor. With the exposure correction switch S6 maintained on, when the shift-up switch S4 is turned on, the pulse generating circuit 27 produces a train of UP pulses which are counted up by the counter 28. For the first three pulses, for example, from the circuit 27, the counter 28 has a content of [10]. Therefore, the decoder 29 sends a signal of high level only to the input terminal A10 of the control circuit 26, causing the lighted dot mark to effectively shift three steps rightward to the tenth place (counting from the left) which is in registry with "2" in the exposure correction scale as shown in FIG. 8B. To set this value in the camera, the operator needs to open the switch S6 as soon as the tenth dot mark for "2" starts to light on. If so, the input terminal F of the control circuit 26 is supplied with a signal of high level. This signal is then applied, through the inverter 101 and OR gate 104, to the input terminal Y of the data selector 110, thereby the liquid crystal display 7 is caused to present the display that the fresh film frame is in the exposure aperture or gate. In this case, however, because the input terminal A7 is supplied with a signal of low level, and a signal of high level is produced at the output terminal E, the scale pattern 17 also appears at the same time. And, also because the input terminal A10 is supplied with a signal of high level, the AND gate 107-10 is gated on to pass a train of pulses of 2 Hz to the exclusive OR gate 108-10 therethrough. Responsive to these signals, the data selector 110 causes that dot mark, which is in registry with "2" in the scale, to blink, while the other dot marks remain continuously lighted, as shown in FIG. 8C.

Next, assuming that while the value "2" of the exposure correction factor is being set in the camera, the camera is unloaded, then the switch S1 is turned off, causing the output of the OR gate 20 to change to high level. Thereby the frame counter 19 is reset to "0", and the output of the OR gate is changed to low level. Then, the outputs of the inverter 105 and OR gates 104 and 109 change to high level. Responsive to this, the data selector 110 applies the signals a1 to a13 at the output terminals D1 to D13, and the signal of high level appears at the output terminal E. Also because the content of the frame counter 19 is [0], the decoder 23 produces an output signal representing "blank" (see FIG. 7). Meanwhile, because the switch S1 is OFF, the inverter 21 produces an output signal of low level. These signals are applied to the liquid crystal drive circuit 38. Thus, the pattern 16 and the second digital display portion 13 disappear, leaving the scale pattern 17 and that dot mark, which represents the value "2", appearing, as shown in FIG. 8D.

If the back cover is left open, the switch S2 is OFF. In this case, therefore, similarly to the foregoing case, the output of the OR gate 20 changes to high level. Thereby, the display of FIG. 8D is presented in the liquid crystal display area 7. If a new film cartridge is inserted into a chamber therefor, the switch S1 is turned on, causing the output of the inverter 21 to change to high level causing the pattern 16 to appear.

According to the above-described embodiment, the bar display portion 18 for the film feeding state is made to also serve as a display for the preset value of the exposure correction factor, thereby giving advantages that the scale for an increased number of values can be formed by a linear array of single segments and the size of each numeral in the scale can be relatively small, contributing to no increase in the size of the area of the liquid crystal display 7. Further, because that dot mark which represents the preset value of the exposure correction factor can be displayed in a different form (continuous lighting or blinking) from that of the display of film feeding, it is possible to see at a glance what value is set in. Also, since the precision of the scale of the exposure correction factor is increased, there is need only to increase the number of dot marks in the row 18, thereby giving additional advantages that the space can be used with high efficiency, and that even when the range of values is extended, all the available values can be seen at a glance. Further, because the scale pattern 17 is constructed with single segments, the values between $\frac{1}{4}$ and $\frac{1}{2}$, or $\frac{1}{2}$ and 1, for example, can be represented by dots which are easier to read than when the dots are replaced by numeral characters.

Though the foregoing embodiment has been described in connection with the use of single segments 17 for making a scale of exposure correction factor, the present invention is not confined thereto. For example, a printed scale may be employed. If so, without the necessity of increasing the total number of display elements, the exposure correction information can be additionally displayed. Also, though as the row display portion there has been shown the bar display portion 18 having a linear array of dot marks, the invention is not confined thereto. For example, a circular array of a plurality of marks may be employed.

As has been described above, according to the present invention, the graduations of the scale of the exposure correction factor are positioned in registry with the respective marks in the row display, and control means is provided for changing the form of display of that mark which serves as an index for the scale from that of display of the other marks when any value, except unity, of the exposure correction factor is set. Thereby it is possible to operate the row display portion of a plurality of marks with selection of two modes, one of which is assigned to be displayed when the film is readied for making an exposure, and the other of which is assigned to display what value of the exposure correction factor is set. Thus, a comfortable viewing of the exposure correction information can be achieved without involving any increase in the size of the area of the display device in the upper panel of the camera housing.

What is claimed is:

1. A display device for a camera comprising:
   (a) a plurality of patterns adjacently disposed to each other;
   (b) a drive circuit for detecting a film feeding operation by a film feeding mechanism and for having said plurality of patterns change their forms of display time-serially, one after another, during film feeding, said circuit having a first display mode for fixing a particular display pattern upon completion of the film feeding operation, and a second display mode for selecting and displaying one of said patterns corresponding to a set information in response to an operation of an exposure information setting operation member; and
   (c) a control circuit for prohibiting a response by the drive circuit to the operation of said operation member when the film feeding operation is being performed by said film feeding mechanism, and allowing a shift to said second display mode by an operation of said operation member upon completion of the film feeding operation.

2. A display device according to claim 1, wherein said information setting operation member has first and second members, and the display is placed in the second mode by operating said first member, then the setting of information is done by operating said second member under the state that the first member is in operation.

3. A display device for a camera comprising:
   (a) a plurality of patterns disposed in a row; and
   (b) a display control circuit for having a display of said plurality of patterns time-serially changed during a film feeding operation by a film feeding mechanism in response to the film feeding operation by said mechanism, said circuit having a first display mode to place the plurality of patterns simultaneously in a display state upon completion of the film feeding operation, and shifting from the first display mode to a second display mode in response to an operation of an information setting operation member after a completion of the film feeding operation, then selectively placing, in said second display mode, only one particular pattern suited to the set information, in a display state out of the plurality of patterns which have been placed in a display state simultaneously by the completion of the film feeding operation during such period of time that said operation member is in an operating state, and after having been shifted to the second display mode, further shifting to a third display mode by a release of the operation of said operation member, then in said third display mode, placing the patterns other than said one particular pattern which was placed in a display state in said second display mode, in a same simultaneous display state as that in the time of the completion of the film feeding operation, out of said plurality of patterns which have been placed simultaneously in a display state upon completion of the film feeding in the first display mode.

4. A display device according to claim 3, wherein said display state of the pattern is a lighted display pattern and the particular pattern in the third mode is a blinking display pattern.

5. A display device according to claim 3, wherein said information setting operation member is an exposure correction information setting operation member.

6. A display device according to claim 3, wherein said information setting operation member has first and second members, and the display is placed in the second mode by operating said first member, then the setting of information is done by operating said second member under the state that the first member is in operation.

* * * * *